United States Patent
Kodama et al.

(10) Patent No.: US 6,489,373 B2
(45) Date of Patent: Dec. 3, 2002

(54) METHOD FOR DECOMPOSITION AND RECOVERY OF POLYURETHANE RESIN

(75) Inventors: Katsuhisa Kodama, Osaka (JP); Kouichi Murayama, Osaka (JP); Takashi Kumaki, Osaka (JP)

(73) Assignee: Mitsui Takeda Chemicals Inc., Tokyo (JP)

( * ) Notice: Subject to any disclaimer, the term of this patent is extended or adjusted under 35 U.S.C. 154(b) by 0 days.

(21) Appl. No.: 09/411,177

(22) Filed: Oct. 1, 1999

(65) Prior Publication Data

US 2002/0049258 A1 Apr. 25, 2002

Related U.S. Application Data

(60) Provisional application No. 60/147,095, filed on Aug. 4, 1999.

(30) Foreign Application Priority Data

Oct. 2, 1998 (JP) ............................................. 10-280628

(51) Int. Cl.$^7$ ............................ C08J 11/14; C08J 11/28; C07C 209/62; C07C 29/09; C07C 29/128
(52) U.S. Cl. ..................... 521/49.5; 521/49; 528/481; 528/492; 528/494; 528/495; 528/496; 528/499; 528/502 A; 528/503; 564/489; 564/497; 564/498; 568/852; 568/854; 568/858; 568/861; 568/868
(58) Field of Search ................... 521/49.5, 49; 528/481, 528/492, 495, 494, 496, 499, 502 A, 503; 564/489, 497, 498; 568/852, 854, 858, 861, 868

(56) References Cited

U.S. PATENT DOCUMENTS

| 3,225,094 | A |   | 12/1965 | Wolf ........................... 564/330 |
|---|---|---|---|---|
| 4,316,992 | A | * | 2/1982 | Gerlock et al. ............. 568/621 |
| 4,317,939 | A | * | 3/1982 | Gerlock et al. ............. 568/121 |
| 5,534,556 | A | * | 7/1996 | Bauer .......................... 521/49 |
| 5,616,623 | A | * | 4/1997 | Munzmay et al. ......... 521/49.5 |
| 5,714,523 | A | * | 2/1998 | Hopper et al. ............. 521/49.5 |
| 5,906,998 | A |   | 5/1999 | Hoshino et al. ........... 521/49.5 |

FOREIGN PATENT DOCUMENTS

| CA | 1 144-569 | 4/1983 |
|---|---|---|
| EP | 0 854 165 A1 | 7/1998 |
| EP | 0 854 165 | 7/1998 |
| EP | 0 976 719 A1 | 2/2000 |
| GB | 991387 | 5/1963 |
| JP | 9-151270 | 6/1997 |
| WO | WO98/34904 | 8/1998 |

OTHER PUBLICATIONS

Advances in Plastics Recycling, vol. 1, 3–9 (1999).

* cited by examiner

Primary Examiner—Rabon Sergent
(74) Attorney, Agent, or Firm—Merchant & Gould P.C.

(57) ABSTRACT

The present invention provides a method of recovering a polyamine compound and/or a polyol compound useful for starting materials of polyurethane resin in an industrially advantageous manner by first dissolving the polyurethane resin such as polyurethane foams discharged in a large amount as industrial wastes in a solubilizing agent containing a polyamine compound, a low molecular glycol or an amino alcohol, hydrolyzing the resulting solution with liquid water at 200 to 320° C., then recovering the polyamino compound and/or polyol compound thus formed.

4 Claims, No Drawings

METHOD FOR DECOMPOSITION AND RECOVERY OF POLYURETHANE RESIN

This application is a Utility Application claiming benefit under Title 35, United States Code §119(e) of Provisional Application Number 60/147,095 filed Aug. 4, 1999.

FIELD OF THE INVENTION

The present invention relates to a method of recovering a polyamine compound and/or a polyol compound useful for the starting materials of polyurethane resin in an industrially advantageous manner by chemically decomposing scraps generated in the process of fabricating polyurethane resin products, or from waste generated after the use of the polyurethane products.

BACKGROUND OF THE INVENTION

The polyurethane resin is used widely in a large amount not only as soft(flexible), semi-rigid and rigid urethane foams in furniture and bedding such as sofas, beds etc., cushioning materials in automobile sheets etc., and thermal insulating materials such as in refrigerators etc., but also as an elastomer in shoe soles, tires, belts etc. Recently, conservation of natural resources and environmental concerns have come to be regarded as important, and methods of recycling and reusing various plastic products including polyurethane resin are separately examined. Methods known so far for recycling polyurethane resin can be roughly divided into (1) material recycling technique, (2) chemical recycling technique, and (3) energy recycling technique.

As the material recycling technique (1), there are examined a method of reusing scrap polyurethane foams as cushioning materials or thermal insulating materials by means of re-bonding or compression molding thereof and a method of grinding foams and elastomer to use the resulting mixture as fillers etc. in new raw materials. The chemical recycling technique (2) is a method of reusing polyurethane resin by decomposing it into its starting materials or chemical materials utilizable as raw materials for chemical products, and there are known a glycol decomposition method, an amine decomposition method and a hydrolysis method. The energy recycling technique (3) is the technique of using polyurethane resin as fuel to recover heat and vapor therefrom.

The technique (1) above has a problem with qualities of the products for cushioning or thermal insulating materials, and its utilities are significantly limited. It is noted that the technique (3) is in danger of causing new pollution problems such as generation of harmful substances resulting from combustion.

The compounds recovered by the chemical recycling technique (2) above have a wide variety of applications once the technique is economically and industrially feasible, and the chemical recycling technique would be one of the ideal recycling techniques.

In the glycol decomposition or the amine decomposition methods, however, urethane and urea linkages, which are relatively easily decomposed among the various linkages in polyurethane resin such as urethane linkages, urea linkages, biuret linkages, allophanate linkages etc., are decomposed with glycol or amine compounds and then subjected to an exchange reaction with the glycol or amine for fluidization.

In these reactions, the glycol or amine used as a decomposer newly forms urethane linkages and urea linkages to be incorporated in the liquid decomposition product and gives new urethane and urea derivatives. Accordingly, this technique does not decompose polyurethane resin into polyol as its starting material or into a polyamine compound as an intermediate of polyisocyanate, so use of the recovered material is also limited.

Further, a method of hydrolyzing polyurethane resin with water as a decomposer has also been proposed.

For example, Japanese Laid-Open Patent Publication No. 70377/1979 discloses a method of hydrolyzing polyurethane foams with heated steam at 300° C. and 0.4–10 atmospheric pressure in the presence of an alkali metal or alkaline earth metal compound. It is suggested that when such low atmospheric-pressure steam is used, the rate of reaction is low and the presence of a catalyst is essential.

Recently, a method of hydrolizing polyurethane resin to low molecular weight compounds by high-pressure and high-temperature liquid water and recovering them has also been proposed (WO98/34904). When material to be hydrolized consists of only polyurethane resin and does not contain any other foreign materials not to be hydrolyzed, the method might be useful. However, major polyurethane waste material discharged from the industrial fields is shredder dust from automobile sheets, and it usually contains scraps of foreign matter such as fiber, leather, metal, wood and the like which are not hydrolyzed with the liquid water. As a practical matter, it is not possible before use to remove the foreign matter other than polyurethane foams from shredder dust. Therefore, as long as the shredder dust is used as the material to be decomposed, the non-hydrolizable foreign matters will remain in the decomposed mixture as solid. In order to remove the insolubles from the decomposed mixture, the method have to be conducted batch-wise and the high pressure in the reactor should be reduced to normal atmospheric pressure every time for removal of the insolubles by filtration.

Moreover, the polyurethane foam is hydrophobic and therefore, the weight ratio of added water (hydrolysate/water ratio) should be raised in order to treat such bulky foams and it takes a long time for hydrolysis of the foam. Accordingly, the method cannot be economical nor practical because of the necessity for large-scale high-pressure facilities and high energy costs.

SUMMARY OF THE INVENTION

As a result of their eager study on a method for continuous decomposition of polyurethane resin and recovery of the decomposed materials, the present inventors have found that the polyurethane resin is first dissolved with a solubilizing agent containing a polyamine compound, a low molecular weight glycol or an amino alcohol, then the insolubles are removed by, for example, filtration if necessary, and the resulting solution is continuously fed to a pressure resistant apparatus at high temperature and high pressure whereby the polyurethane resin can be decomposed rapidly and completely, even at a low ratio of added water, to a polyol compound useful for a starting material of the polyurethane resin and a polyamine compound as an intermediate of polyisocyanate. Further, the inventors also found that a part of the decomposed mixture or hydrolysates can be circulated as such for use as the solubilizing agent and this method was confirmed to be a method that can be realized economically and industrially.

Therefore, one aspect of the present invention encompasses a method for decomposition of polyurethane resin and recovery of the decomposed products, which comprises dissolving polyurethane resin in a solubilizing agent containing a polyamine compound, a low molecular weight glycol or an amino alcohol, then decomposing or hydrolyzing the resulting solution with liquid water at 200 to 320° C., and recovering the polyamine compound and/or the polyol compound thus formed. The dissolution may be conducted at 120 to 250° C., more particularly, at 150 to 230° C. The hydrolysis conducted in liquid water at 200 to 320° C., more preferably, at 250 to 300° C. Also, a part of the polyamine compound and/or the polyol compound thus formed by hydrolysis may be used for feedback to the dissolving step as the solubilizing agent.

DETAILED DESCRIPTION OF THE INVENTION

The polyurethane resin to be decomposed in the present invention is a polymer substance obtained generally by reacting a polyisocyanate compound with an active hydrogen compound.

The polyisocyanate compound includes e.g. toluylene diisocyanate (TDI), diphenyl methane diisocyanate (MDI), polymeric MDI (PMDI), hydrogenated MDI, modified MDI, isophorone diisocyanate (IPDI), hexamethylene diisocyanate (HDI), xylylene diisocyanate (XDI), hydrogenated XDI etc.

A typical example of the active hydrogen compound is a polyol compound, and the polyol compound includes e.g. polyester polyols, acrylic polyols etc. in addition to 2- to 8-functional polyether polyols derived from an alkylene oxide such as ethylene oxide, propylene oxide or the like in the presence of an active hydrogen-containing initiator.

In the method of the present invention, every polyurethane resin containing urethane linkages, allophanate linkages, urea linkages, biuret linkages, amide linkages etc. can be subjected to decomposition regardless of what molecular structure, constitutional units and degree of polymerization the resin has.

From the view point of the yield of the decomposed products, and efficiency of purification and recovering of the products, the polyurethane resin produced by the reaction of the following isocyanate and polyol compound are preferably employed.

Examples of the suitable polyisocyanate include TDI, modified TDI (e.g., modified product having biuret linkage, trimerized product) and the mixture of TDI and PMDI. Preferable examples of the isocyanate are TDIs containing 60 to 100% of 2,4-toluylene diisocyanate, such as TDI having 100% of 2,4-TDI (Takenate-100®, Takeda Chemical), TDI having 80% of 2,4-TDI (Takenate-80®, Takeda Chemical), TDI having 65% of 2,4-TDI (Takenate-65®, Takeda Chemical), TDI having 64% of 2,4-TDI (Takenate-TM20® (TDI-80/PMDI=80/20), Takeda Chemical), TDI having 40% of 2,4-TDI (Takenate-TM50® (TDI-80/PMDI=50/50), Takeda Chemical), modified products and prepolymer therefrom. Particularly, TDI having about 80% of 2,4-TDI and the modified products thereof are preferable.

Examples of suitable polyol include one having functionality of 2 to 4, preferably, 3 to 4, and OH value of 10 to 100 mgKOH/g, preferably, 24 to 80 mgKOH/g. Polyoxypropylene glycols containing 0 to 20 weight % of ethylene oxide chain in the molecules (ACTCOL MF-53®, MF-56®, MF-59®, Takeda Chemical) are also preferable.

The polyurethane resin as the material for decomposition in the present invention includes e.g. undesired products and scrap or cut dust generated in the process of fabricating soft, semi-rigid or hard polyurethane foam products used in cushioning materials such as beds, sofas and chairs used generally in homes and offices, automobile sheets, head rests, sun visors, instrument panels, arm rests, or wastes from these products after use, or scraps generated at the time of producing polyurethane resin elastomer products such as tires, tubes, shoe soles etc. and wastes thereof after use.

It is preferable that when the material for decomposition is a foam, it should be cut by a shredder and that when the material is elastomer, it should be ground. It doesn't matter at all whether or not they contain a certain amount of insoluble fibers, hides, synthetic hides, wood and metals used in their products because the insolubles can be removed easily by, for example, filtration.

The polyamine compound as the solubilizing agent for polyurethane resin in the present invention may be any compound having two or more amino groups in its molecule. The examples of the polyamine compound include those used as a starting material for production of the conventional polyurethane resin. A typical example is toluylene diamine, and it is also possible to use diaminophenylmethane, polymethylpolyphenylpolyamine, isophorone diamine, hexamethylele diamine, xylylene diamine etc. or a mixture thereof.

The low molecular weight glycol as the solubilizing agent used in the present invention is a glycol having a molecular weight of 200 or less, preferably, 150 or less. The example of the glycol includes ethylene glycol, diethylene glycol, propylene glycol, dipropylene glycol, butane diol, hexane diol and the like.

The amino alcohol used in this invention may be any compound having at least one amino group and at least one hydroxyl group in its molecule and having a molecular weight of 200 or less, preferably, 150 or less. The examples of the amino alcohol include alkanol amine such as methanol amine, ethanol amine, dialkanol amine such as diethanol amine and dipropanol amine, trialkanol amine such as triethanol amine, and these amino alcohols may be used alone or in combination.

Among them, the preferred solublizing agent are toluylene diamine, ethylene glycol, diethylene glycol and moloethanol amine. These solubilizing agent may be used solely or in combination.

Polyether polyol with 2–8 functionality and 100–2000 hydroxy group equivalency may be incorporated in the solubilizing agent. In addition, alkaline metal hydroxide such as sodium hyroxide and potassium hydroxide and ammonia can be used in a small amount as decomposition catalyst. The mixing ratio by weight of the solubilizing agent to the polyether polyol ranges from 1:0.5–5. A too high mixing ratio of the polyether polyol is not preferable because the amount of polyurethane resin dissolved will be small.

The preferable ratio by weight of the solubilizing agent to the polyurethane resin ranges from 1:0.2–5 and more preferable ratio ranges from 1:0.5–3.

One of the most preferable and practical solubilizing agent, is a hydrolysate of polyurethane resin obtained in the subsequent step of this method.

The dissolution of polyurethane resin with a solubilizing agent proceeds with cleavage of urethane linkage and urea linkage in the polyurethane resin.

The temperature at which the polyurethane resin is dissolved in the solubilizing agent usually is in the range of 120 to 250° C., preferably 150 to 230° C. If the temperature is too low, its dissolution requires a long time, while if the temperature is too high, the solubilizing agent is decomposed or polymerized, thus causing a reduction in yield.

The liquid dissolving the polyurethane resin is passed through a filter if necessary to remove insolubles such as fibers and other materials, and then introduced into an apparatus for hydrolysis. Examples of the filter include an automatic fiber press, a rotating disk-type filter and a centrifugal filter, which are provided with a filter cloth made of Teflon, PPS (polyphenylene sulfide) and glass fibers, metal gauze such as SUS metal gauze, ceramic filters etc.

The structure of the apparatus for hydrolysis is not particularly limited, and in a preferable example, the apparatus is designed such that the liquid dissolving polyurethane resin and heated water are mixed in the bottom of the column, then the mixture is pushed up toward the main body of the column, and the =decomposition liquid and the carbon dioxide gas generated are continuously discharged to the outside through a pressure-control valve set at the top of the column. In short, it is possible to use any apparatus structured to secure pressurizing capable of maintaining the high temperature for liquid water as well as a retention time necessary for hydrolysis.

The temperature in the hydrolysis step is in the range of 200 to 320° C., preferably 250 to 300° C. A too low temperature leads to a low rate of decomposition, while a too high temperature causes side reactions such as cleavage of ether linkages and condensation of the formed polyamine compound. The pressure in this step does not directly influence yield, but is preferably kept at least at the pressure at which the heated water can remain liquid. Although the ratio of the liquid to be hydrolyzed to heated water by weight (ratio of added water) is varied depending on the type of polyurethane resin decomposed, the weight ratio of added water to the liquid is in the range of usually 0.3 to 5.0, preferably 0.5 to 3.0. If the ratio of added water is too low, decomposition or hydrolysis into a polyamine compound and a polyol compound is incomplete. On the other hand, a too high ratio is not economical because large facilities are required and the loss of energy is significant. This reaction proceeds even in the absence of a catalyst, but a small amount of an alkaline metal hydroxide, ammonia or the like also can be used as a catalyst.

The reaction time for the hydrolysis depends on the reaction temperature and the ratio of the added water, and is usually from about 5 minutes to about 2 hours, preferably from about 10 minutes to about 1 hour.

The hydrolysate is then introduced into a dehydrator. Most of the water and the carbon dioxide gas are gasified under reduced pressure by means of a pressure-control valve and recovered as a gas. The water also can be removed by distillation under reduced pressure or bubbling with dry nitrogen etc.

The hydrolysate thus obtained is substantially a mixture of the solubilizing agent and decomposed products of polyurethane resin, i.e. a polyamine compound and a polyol compound. The solubilizing agent and the polyamine compound recovered by, for example, by distillation under reduced pressure from the resulting mixture can be subjected to feedback for use in the dissolving step as the solubilizing agent for polyurethane resin. The remainder of the hydrolysate can be separated into the polyamine compound and the polyol compound by a method known in the art, such as distillation, centrifugation, or solvent extraction. This procedure can be selected suitably depending on the type of polyurethane resin decomposed. Further, the hydrolysate without separating the polyamine compound therefrom can be reacted with an alkylene oxide such as propylene oxide to convert its amino terminal group into a hydroxyl group for use as polyol.

The recovered polyamine compound and polyol compound are substantially the same as those employed in the production of polyurethane resin, and therefore can be reused as the starting materials for polyurethane resin, respectively.

EXAMPLES

Hereinafter, the present invention is described in more detail by reference to the Examples, which however are not intended to limit the present invention.

Example 1

50 g of toluylene diamine and 50 g of polyoxypropylene triol with a molecular weight of 3,000 were introduced into a 500-ml 4-necked flask equipped with a thermometer, a stirrer and a nitrogen gas inlet, and its temperature was raised to 170° C. by heating from the outside. 30 g of scrap specimen from a soft polyurethane foam having a density of about 25 kg/m$^3$ produced by a reaction of polyoxypropylene triol having a molecular weight of 3,000 and toluylene diisocyanate (Takenate 80: Takeda Chemical Industries, Ltd.) was added to the above solution, and the mixture was stirred at the same temperature for 1 hour whereby the foam was completely dissolved. The viscosity of the solution after cooled to 25° C. was about 10,000 mPa.

Then, 50 g of the solution obtained above and 50 g of purified water were introduced into an autoclave (internal volume: 200 ml) equipped with a thermometer and a pressure gauge, and the atmosphere in the autoclave was replaced with nitrogen gas. The temperature of the mixture was raised to 270° C. by heating from the outside. The inside pressure was 68 kg/cm$^2$G. It was left at the same temperature for 20 minutes, but there was no further increase in pressure. The autoclave was cooled to room temperature, and the content was diluted with methanol and analyzed by gel permeation chromatography (GPC). The results indicated that there was no peak of polymeric polyol compound other than a peak of triol having a molecular weight of 3,000, and in the region of amine, and that there was only a peak of toluylene diamine. It was further confirmed by NMR analysis that there was no urethane linkage nor urea linkage in the decomposed products. These facts showed that the polyurethane foam was decomposed completely into toluylene diamine and polyoxypropylene triol.

Example 2

A mixed solution consisting of 120 g of toluylene diamine and 80 g of polyoxypropylene triol with a molecular weight of 3,000 was heated at 160° C. in the same manner as in Example 1. 100 g of scrap specimen from molded foam (density: 50 kg/m$^3$) of automobile sheet obtained by the reaction of the starting materials toluylene diisocyanate and polyether triol having a molecular weight of 5,000 activated with ethlene oxide at the terminals, was added to the above solution, and the foam was stirred for 1 hour whereby it was completely dissolved.

A mixture of 40 g of the solution obtained above and 60 g of purified water was heated in the same manner as in Example 1 and left at 250° C. for 30 minutes. The pressure became constant at 50 kg/cm$^2$ G. The autoclave was cooled to room temperature, and the contents were analyzed in the same manner as in Example 1. The result indicated that there was no urethane linkage nor urea linkage in the decomposed product, and GPC analysis also indicated that there was no peak of polymeric substance other than peaks of polyether polyol used as the starting material and solubilizing agent, and that there was only one peak of toluylene diamine in the region of amine.

Example 3

In 40 g of the hydrolysate obtained in Example 1, 10 g of the same soft polyurethane foam as used in Example 1 was added and stirred at 180° C. for 45 minutes, and the foam was completely dissolved. 45 g of the resulting solution and 55 g of purified water were introduced into the same autoclave and heated to 280° C. in the same manner as in Example 1. After being kept for 20 minutes at the same temperature, the autoclave was cooled and the content was diluted with methanol and analyzed by GPC and NMR etc. The results indicated that there was no urethane linkage nor urea linkage in the decomposed product, and GPC analysis also indicated that there was no peak of polymeric substance other than peak of polyoxypropylene triol having a molecular weight of 3,000 employed as starting materials, and that there was only a peak of toluylene diamine in the region of amine.

Example 4

300 g of diethylene glycol was introduced into a 500-ml 4-necked flask equipped with a thermometer, a stirrer and a nitrogen gas inlet, and its temperature was raised to 200° C. by heating from the outside. 200 g of scrap specimen from a soft polyurethane foam having a density of about 25 kg/m³ produced by a reaction of polyether triol having a molecular weight of 3,000 activated with ethylene oxide at the terminals and toluylene diisocyanate (Takenate 80: Takeda Chemical Industries, Ltd.) was added to the above solution at the same temperature over 1 hour, and the mixture was stirred at the same temperature for another 1 hour, whereby the foam was completely dissolved. The viscosity of the solution after cooled to 25° C. was about 400 mPa.

Then, 50 g of the solution obtained above and 50 g of purified water were introduced into an autoclave (internal volume: 200 ml) equipped with a thermometer and a pressure gauge, and the atmosphere in the autoclave was replaced with nitrogen gas. The temperature of the mixture was raised to 270° C. by heating from the outside. The inside pressure was 68 kg/cm²G. It was left at the same temperature for 20 minutes, but there was no further increase in pressure. The autoclave was cooled to room temperature, and the content was diluted with methanol and analyzed by GPC. The results indicated that there was no peak of polymeric polyol compound other than a peak of triol having a molecular weight of 3,000 in the region of polyol, and that there were only two peaks of the respective diethylene glycol used as the solubilizing agent and toluylene diamine in the region of low molecular compounds. It was further confirmed by NMR analysis that there was no urethane linkage nor urea linkage in the product.

Example 5

300 g of monoethanolamine was introduced into a 500-ml 4-necked flask equipped with a thermometer, a stirrer and a nitrogen gas inlet, and its temperature was raised to 170° C. by heating from the outside. 250 g of scrap specimen from a soft polyurethane foam having a density of about 25 kg/m³ produced by a reaction of polyoxypropylene triol having a molecular weight of 3,000 which was produced by the addition reaction of propylene oxide to glycerol, and toluylene diisocyanate (Takenate 80: Takeda Chemical Industries, Ltd.) was added to the above solution at 170° C. over 1 hour, and the mixture was stirred at the same temperature for another one hour whereby the foam was completely dissolved. The viscosity of this solution after cooled to 25° C. was about 900 mPa.

Then, 40 g of the solution obtained above and 60 g of purified water were introduced into an autoclave (internal volume: 200 ml) equipped with a thermometer and a pressure gauge, then the atmosphere in the autoclave was replaced with nitrogen gas, and the temperature of the mixture was raised to 270° C. by heating from the outside. The inside pressure was 78 kg/cm²G. It was left at the same temperature for 30 minutes, but there was no further increase in pressure. The autoclave was cooled to room temperature, and the content was diluted with methanol and analyzed by GPC. The results indicated that there was no peak of polymeric polyol compound other than a peak of the polyol having a molecular weight of 3,000, and that there were only peaks of monoethanolamine and toluylene diamine in the region of amine. It was further confirmed by NMR analysis that there was no urethane linkage nor urea linkage in the decomposed product.

As stated above, the present invention comprises first dissolving polyurethane resin in a solubilizing agent containing a polyamine compound, a lower molecular weight glycol or an amino alcohol, filtering it to remove insolubles if necessary, and hydrolyzing the obtained solution with liquid water at a temperature of 200 to 320° C. in order to decompose the resin and to recover its decomposed products, polyamines and polyols. Therefore, the present invention is advantageous because even if the foam scrap contains insolubles such as fibers, hides, synthetic hides, wood and metal, it can be decomposed continuously to a polyol compound and/or a polyamine compound, and these can be recovered easily.

Furthermore, the present method is an economically and industrially advantageous method because the recovered decomposition liquid can be returned as the solubilizing agent repeatedly to the apparatus for the dissolving step, thus making it unnecessary thereafter to feed an additional solubilizing agent.

While a detailed description of the invention has been provided above, the invention may be embodied in other specific forms without departing from the spirit thereof. The disclosed embodiments should be considered as illustrative rather than restrictive, the scope of the invention being indicated by the appended claims, with all changes that come within the meaning and range of equivalency of the claims being intended to be embraced therein.

We claim:

1. A method for decomposition of polyurethane resin from a product that contains a polyurethane resin member and a non-polyurethane resin member and recovery of decomposed products, which comprises a step of treating the product with a solubilizing agent consisting essentially of polyamine compound at a temperature of 150 to 230° C. to dissolve polyurethane resin, a step of filtering insoluble material of the non-polyurethane resin member of the product from the resulting solution, a step of hydrolyzing the filtered solution with liquid water at a temperature of 250 to 300° C., in the absence of a catalyst, and under a pressure at which the heated water remains liquid, the filtered solution being fed continuously for hydrolyzing, and a step of recovering the polyamine compound and/or the polyol compound thus formed from the decomposition of the polyurethane, wherein the step of hydrolysis is conducted at a weight ratio of added water to the liquid to be hydrolyzed in the range of 0.3:1 to 5.0:1.

2. A method according to claim 1, wherein the solubilizing agent is a polyamine compound selected from the group consisting of toluylene diamine, diaminodiphenyl methane, polymethyl polyphenyl polyamine, isophorone diamine, hexamethylene diamine and xylylene diamine.

3. A method according to claim 1, wherein a part of the polyamine compound from the hydrolysate mixture is used for feedback as the solubilizing agent.

4. A method according to claim 1, wherein the polyamine compound is toluylene diamine.

* * * * *